(12) United States Patent
Nieuwenhuis et al.

(10) Patent No.: US 10,365,394 B2
(45) Date of Patent: Jul. 30, 2019

(54) WORKFLOW TO USE BOREHOLE COMPLETION AS ANTENNA FOR GEOPHYSICAL APPLICATIONS

(71) Applicant: GroundMetrics, Inc., San Diego, CA (US)

(72) Inventors: Greg Nieuwenhuis, San Diego, CA (US); Michael Wilt, Walnut Creek, CA (US)

(73) Assignee: GroundMetrics, Inc., San Diego, CA (US)

( * ) Notice: Subject to any disclaimer, the term of this patent is extended or adjusted under 35 U.S.C. 154(b) by 430 days.

(21) Appl. No.: 15/227,510

(22) Filed: Aug. 3, 2016

(65) Prior Publication Data
US 2017/0038492 A1    Feb. 9, 2017

Related U.S. Application Data

(60) Provisional application No. 62/200,332, filed on Aug. 3, 2015.

(51) Int. Cl.

| | | |
|---|---|---|
| *G01V 3/26* | (2006.01) | |
| *G01V 3/08* | (2006.01) | |
| *G01V 3/30* | (2006.01) | |
| G01V 3/18 | (2006.01) | |
| G01V 3/10 | (2006.01) | |
| G01V 3/20 | (2006.01) | |

(52) U.S. Cl.
CPC ............... *G01V 3/30* (2013.01); *G01V 3/08* (2013.01); *G01V 3/26* (2013.01); *G01V 3/10* (2013.01); *G01V 3/18* (2013.01); *G01V 3/20* (2013.01)

(58) Field of Classification Search
None
See application file for complete search history.

(56) References Cited

U.S. PATENT DOCUMENTS

| | | | | |
|---|---|---|---|---|
| 6,603,313 | B1 * | 8/2003 | Srnka | G01V 3/12 |
| | | | | 324/354 |
| 7,202,671 | B2 * | 4/2007 | Strack | G01V 3/24 |
| | | | | 324/355 |
| 7,272,503 | B2 * | 9/2007 | Strack | G01V 3/24 |
| | | | | 702/7 |
| 7,746,078 | B2 * | 6/2010 | Bittar | G01V 3/24 |
| | | | | 324/357 |

(Continued)

FOREIGN PATENT DOCUMENTS

| | | |
|---|---|---|
| WO | WO 2012/177349 | 12/2012 |
| WO | WO 2014/039618 | 3/2014 |

(Continued)

*Primary Examiner* — Kibrom K Gebresilassie
(74) *Attorney, Agent, or Firm* — Diederiks & Whitelaw, PLC.

(57) ABSTRACT

An electromagnetic geophysical survey is performed by transmitting current from a first source into earth, the first source being located in a borehole. An electromagnetic field generated by the current transmitted from the first source is measured to create subsurface data. In addition, a background model is constructed and a leakage current distribution is calculated. A resistivity distribution of the earth is calculated using the subsurface data, the background model and the leakage current distribution, with the leakage current distribution being used as a source current distribution.

20 Claims, 6 Drawing Sheets

(56) References Cited

U.S. PATENT DOCUMENTS

| | | | | |
|---|---|---|---|---|
| 7,969,152 B2* | 6/2011 | Velikhov | ............ | G01V 3/12 324/335 |
| 8,131,522 B2* | 3/2012 | Ziolkowski | ............ | G01V 3/12 324/334 |
| 8,188,749 B2* | 5/2012 | Wilt | ............ | G01V 3/30 324/338 |
| 8,532,928 B2* | 9/2013 | Tabanou | ............ | G01V 3/083 702/7 |
| 8,564,296 B2* | 10/2013 | Zhdanov | ............ | G01V 3/083 324/335 |
| 9,611,736 B2* | 4/2017 | Marsala | ............ | E21B 49/00 |
| 9,625,604 B2* | 4/2017 | Cuevas | ............ | G01V 3/38 |
| 10,114,141 B2* | 10/2018 | Morrison | ............ | G01V 3/08 |
| 2004/0069514 A1* | 4/2004 | Rodney | ............ | G01V 11/002 174/350 |
| 2005/0206385 A1* | 9/2005 | Strack | ............ | G01V 3/24 324/347 |
| 2005/0264295 A1* | 12/2005 | Strack | ............ | G01V 3/24 324/375 |
| 2006/0028208 A1* | 2/2006 | Strack | ............ | G01V 3/24 324/355 |
| 2007/0061078 A1* | 3/2007 | Lu | ............ | G01V 3/083 702/2 |
| 2007/0168134 A1* | 7/2007 | Strack | ............ | G01V 3/24 702/7 |
| 2008/0136420 A1* | 6/2008 | Velikhov | ............ | G01V 3/083 324/335 |
| 2009/0150124 A1* | 6/2009 | Wilt | ............ | G01V 3/38 703/1 |
| 2009/0315563 A1* | 12/2009 | Fox | ............ | G01V 3/082 324/345 |
| 2010/0194394 A1* | 8/2010 | Zhdanov | ............ | G01V 3/083 324/335 |
| 2010/0198519 A1* | 8/2010 | Wilt | ............ | G01V 3/30 702/7 |
| 2012/0191353 A1* | 7/2012 | Wilt | ............ | G01V 3/38 702/6 |
| 2012/0293179 A1* | 11/2012 | Colombo | ............ | G01V 3/26 324/339 |
| 2013/0018585 A1* | 1/2013 | Zhdanov | ............ | G01V 3/083 702/2 |
| 2013/0338923 A1* | 12/2013 | Zhdanov | ............ | G01V 3/08 702/6 |
| 2014/0132272 A1* | 5/2014 | Cuevas | ............ | G01V 3/38 324/355 |
| 2017/0068015 A1* | 3/2017 | Morrison | ............ | G01V 3/08 |

FOREIGN PATENT DOCUMENTS

| | | |
|---|---|---|
| WO | WO 2015/073393 | 5/2015 |
| WO | WO 2015/123515 | 8/2015 |
| WO | WO 2015/127211 | 8/2015 |

* cited by examiner

WORKFLOW TO USE BOREHOLE COMPLETION AS ANTENNA FOR GEOPHYSICAL APPLICATIONS

CROSS REFERENCE TO RELATED APPLICATIONS

This application claims the benefit of U.S. Provisional Application No. 62/200,332, which was filed on Aug. 3, 2015 and titled "Workflow to Use Borehole Completion as Antenna for Geophysical Applications". The entire content of this application is incorporated herein by reference.

BACKGROUND OF THE INVENTION

The present invention pertains to the use of a borehole, and associated electrical conductors installed as part of a well completion, as a source antenna for geophysical applications.

The embodiments described herein relate generally to soundings within the earth based upon electrical fields. As used herein, "earth" or "Earth" generally refers to any region in which a borehole may be located including, for example, the lithosphere. Electromagnetic (EM) geophysical surveys probe electrical resistivity, or equivalently, conductivity, in the earth as a function of depth. Typical targets of interest include, without limitation, ore bodies, hydrocarbons, water/steam, proppants, hydraulic fracture (or fracking) fluids, salts, $CO_2$, and other substances injected into the ground, drill hazards such as karsts and hydrates, tracers, markers, permafrost/frozen tundra, hot rock and other geothermal indicators, and environmental pollutants. Since the resistivities of such targets and the surrounding medium may be quite dissimilar, the targets may be discriminated by measuring their subsurface resistivities when subjected to an electromagnetic field. Using this methodology, the depth, thickness, and lateral extent of materials of interest may be determined or monitored.

The source of the EM field used in a geophysical survey may originate in the natural environment or be manmade. If manmade, the source may produce a primarily magnetic or electric field that varies in time, and this primary field can produce a secondary field in the conducting earth. For example, an electric field can produce electric currents in the earth that have an associated magnetic field, and a time varying magnetic field induces electric currents that result in an electric field. The electrical properties of the earth and rate of change of the field determine the relative magnitudes of the secondary and primary fields. The combination of primary and secondary fields results in combined electromagnetic interaction with the earth even for a source arranged to produce solely an electrical or magnetic field.

The distribution of electric current flow produced by an EM source is determined by the three-dimensional (3D) resistivity distribution within the earth. The electric field measured at the surface or at depth within a borehole can be used to infer the 3D resistivity variation over the region where significant current is flowing. The current is typically measured by a suitably calibrated array of electric or magnetic field sensors. The resulting 3D resistivity variation can be used to project the distribution of ores, hydrocarbons, or water within the measured volume.

While the majority of EM geophysical surveys are performed with sensors and EM sources on the surface of the earth, a borehole can provide physical access to the subsurface. Measurement of the electric or magnetic field within a borehole can be related to the electric or magnetic field in the earth around the borehole or the fields that would exist in the earth in the absence of the borehole. Similarly, connecting an electric field or magnetic field source to the earth via a borehole provides a way to produce fields within the earth at desired depths without the attenuation and uncertainties that may result if the source fields originate from a source at the surface of the earth. A particularly beneficial configuration of a borehole EM source is an electrode situated at the top or bottom of a borehole casing, and in electrical contact with that casing, and one or preferably a group or suite of source electrodes at the surface and which may be approximately arranged in a ring approximately centered on the borehole. In this case, significant electric currents in the ground are caused to flow at depth out to a radial distance from the borehole to the surface. Similarly, it is not required that a cased well be utilized, since the electrode can be grounded directly to the earth in an open hole which may or may not contain steel casing at all, resulting in an equally beneficial current flow outward from the borehole at reservoir depth.

Figure 1:
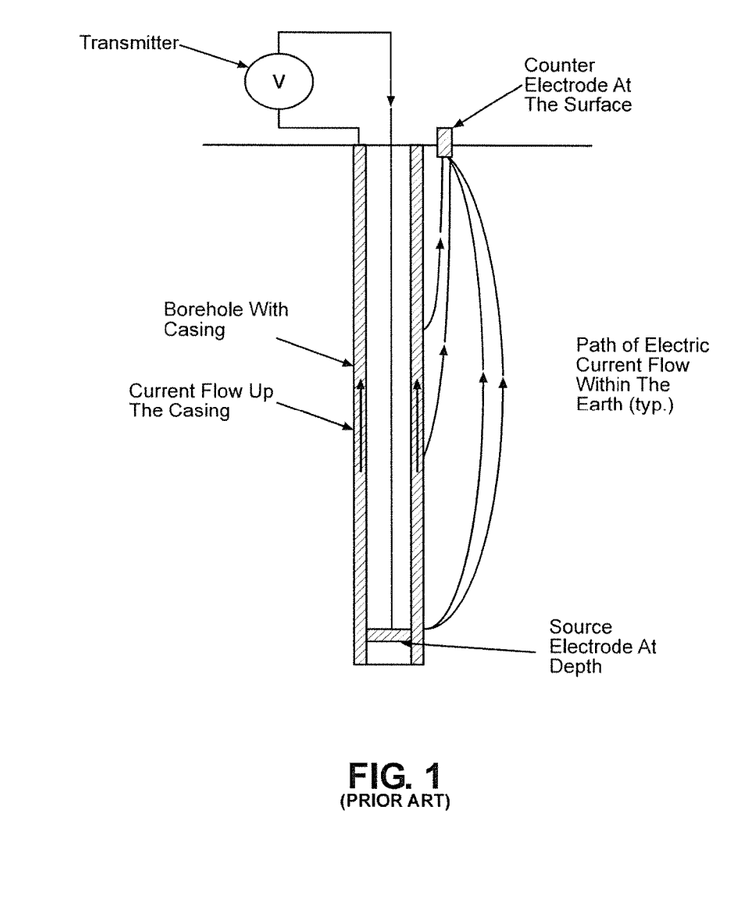
FIG. 1 illustrates a known configuration of a borehole to surface electromagnetic configuration with a source electrode at depth within a borehole and counter electrodes at the earth's surface adjacent to the borehole, with exemplary paths of current flow in the earth and casing being shown.

A new commercial sounding configuration is the Borehole to Surface EM (BSEM) method. FIG. 1 illustrates the current practice comprising an electrode at depth within a borehole, termed the source electrode, and an electrode at the ground surface disposed near to the well that acts as a counter electrode. A transmitter produces a voltage that induces an electric current to flow between the source and counter electrodes. However, the direction of current flow is in general oscillatory, and it is equally true to say the current flows into the ground from the counter electrodes and out via the source. A surface array of receivers measures the EM fields induced by the source.

Figure 2:
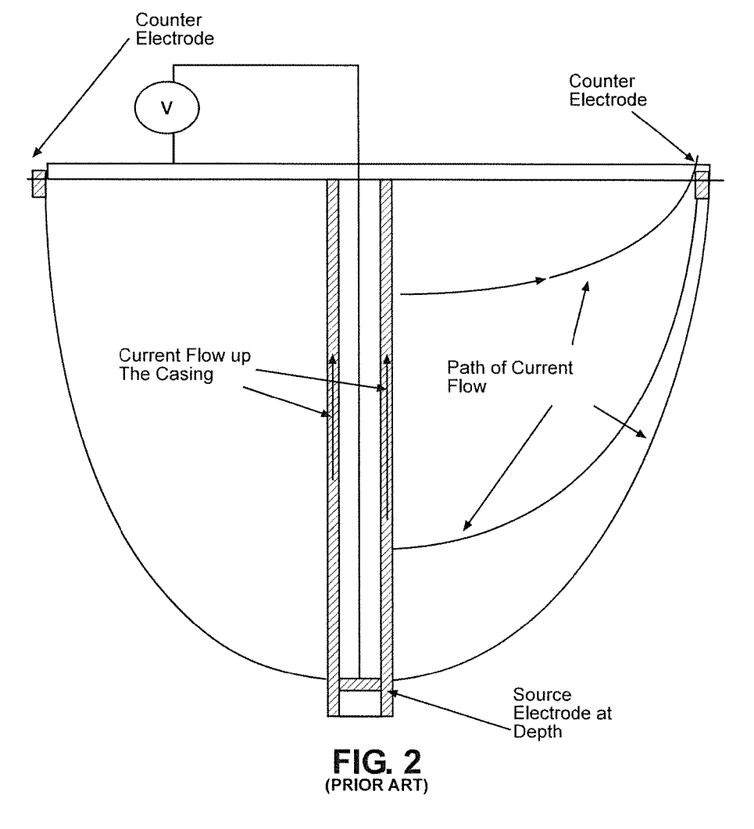
FIG. 2 illustrates another known borehole configuration including a source electrode at depth in a borehole and multiple counter electrodes located at a significant lateral offset distance along the earth's surface.

An advance described in a recently filed International Patent Application No. PCT/US2012/039010 titled "System and Method to Measure or Generate an Electrical Field Downhole" by Hibbs and Glezer (incorporated herein by reference) involves locating a number of counter electrodes at a distance from the well comparable to the depth of the source electrode, and at least not less than 10% of the borehole depth. As illustrated in FIG. 2 of the present application, the subsurface current is forced to flow laterally through the ground (i.e., orthogonal to a vertical borehole) by a distance at least equal to the radial distance between the source and counter electrodes. This configuration increases the current flowing in the ground at formation depth and at large lateral offset from the borehole. Similarly, the placement of the return electrode when transmitting current along a horizontal well can be used to preferentially alter the current flow to focus on a specific region in the subsurface (e.g., placing the return electrode above the toe of a horizontal well to increase current flow out of the toe of the well casing).

Figure 3:
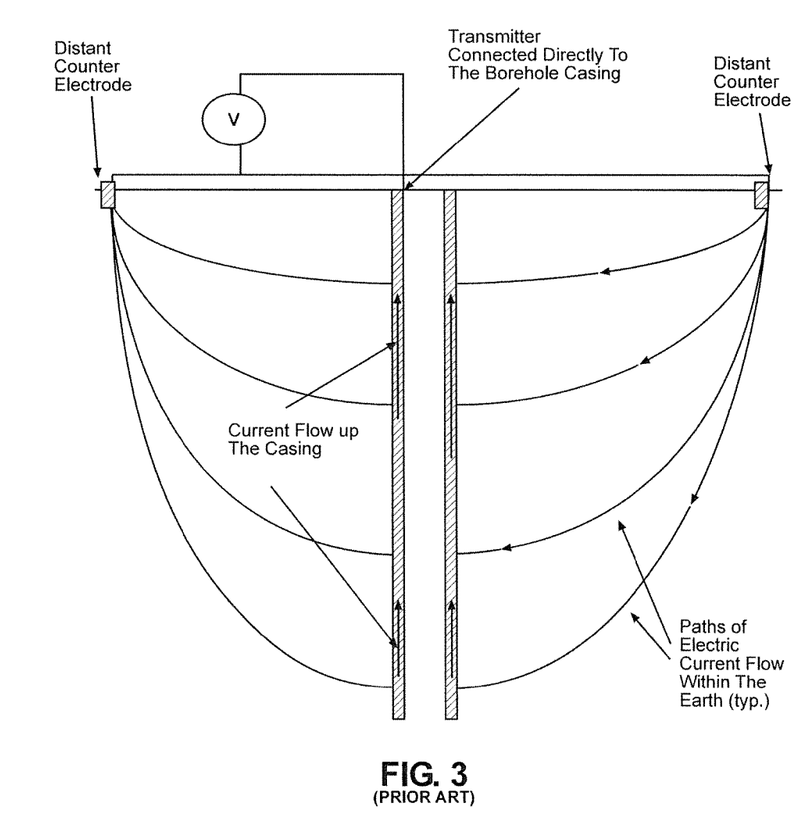
FIG. 3 illustrates a known depth to surface source configuration wherein an electrical connection is made at or near a top of a casing of a borehole and multiple counter electrodes are located at a significant lateral offset distance along the earth's surface.

A disadvantage of the BSEM method is that the borehole must be opened and a wireline is required to lower the source electrode to the desired depth. With this in mind, it has also been proposed, particularly in International Patent Application No. PCT/US2013/058158 titled "System and Method to Induce an Electromagnetic Field Within the Earth" by Hibbs and Morrison (incorporated herein by reference), to not employ a source electrode within the casing at depth, but rather drive the entire casing of the borehole at the desired voltage, V, by making an electrical connection at the top of the casing. Such an arrangement is represented in FIG. 3 of the present application. The top connection can also be implemented by an electrode in the ground near to the casing so that current flows through the earth from the near electrode to the top of the casing. For convenience, an EM source configuration comprised of a conducting well casing and a suite of surface counter electrodes of this type can be termed a Depth to Surface EM (DSEM) source.

In the BSEM and DSEM source configurations shown in FIGS. 1-3, a significant fraction of the total transmitted current flows in the casing. However, even for a uniform casing, the amount of electric current in the casing is not constant along its length. In the configuration shown in FIG. 1, electric current is emitted from the casing into the earth at the bottom of the casing, where the internal source electrode is located, and also emitted into the earth along the entire length of the casing. In the configuration shown in FIG. 2, electric current flows into the earth from the source grounding point at the bottom of the casing and also from along the entire length of the casing. When contact is made by the source to the top of the casing or near the top of the casing as in FIG. 3, current flows down the casing along its entire length, and is radially distributed along the length of the casing into the surrounding earth.

Historically, the presence of conducting casings in boreholes has been considered a problem for surface EM surveys (for which all equipment is deployed at the ground surface), and such surveys have been arranged to avoid placing sources or receivers close to casings. For the recently introduced BSEM method illustrated in FIG. 1, the majority of commercial surveys have been conducted in uncased wells, thereby eliminating the question of current flow in the casing. However, the great majority of boreholes are completed with electrically conducting casings. Furthermore, the DSEM configuration shown in FIG. 3 requires a conducting casing. Therefore, it is of significant practical and commercial benefit to be able to utilize EM data collected via a source that utilizes a cased well.

Many studies of EM geophysical surveys discuss an electrical or magnetic source in a uniform or infinite vertical steel pipe in a layered or cylindrically symmetrical media. This has proven useful, particularly in logging applications, where the targets of the survey are the layers adjacent to the wellbore. Unfortunately, this is an insufficient approximation to real world applications in which wells deviate from the vertical or even extend horizontally and where carbon steel pipe and cementation can vary in physical properties and dimensions throughout the wellbore. In these cases, the source function can be quite complex and describing the generated formation currents is more involved. With this in mind, the workflow described below allows this issue to be addressed in a more general form where the casing is replaced by an equivalent array of electrical sources through a 4-step process. These sources can be applied to 1D, 2D or 3D geophysical problems where the casing geometry may be vertical, deviated, horizontal, fishbone, or similar borehole configurations.

SUMMARY OF THE INVENTION

The present invention involves the use of a borehole, and associated electrical conductors installed as part of a well completion, as a source antenna for geophysical applications. The conductors can comprise the well casing, tubing, rods and fluids, for example. This antenna is energized by deploying an electrode or other conductor, such as a metallic object, deep underground within the borehole with a wire or cable (a "Borehole Source") or attaching such a cable to the well casing at the surface or near the surface. The idea is to energize underground formations by applying a voltage from an external source at one or more positions within a borehole and place a return current electrode on the surface, near the surface, deep underground or in another borehole. The resulting electromagnetic field is measured on the surface, near the surface, or deep underground (such as in another borehole), and this field is used to determine the resistivity distribution within the earth.

In one embodiment, a Borehole Source is used with a metallic cased well (a "Casing Source"). If an electrical source is grounded into a cased well, the entire casing (or nearly the entire casing) is energized as an antenna. This is due to the high electrical conductivity of the casing and the good electrical connection to the formation via the cement and drilling mud. The leakage current from this antenna is a function of the properties of the casing, the formation properties (including the drilling mud and cement properties) and the position of the source or sources with respect to the casing. Although a casing antenna is a powerful source, the complexity of the source function makes it difficult to use a casing antenna as a geophysical tool. This is because the distribution of leakage currents is a key factor in the creation of the electrical and/or magnetic fields used for the surveying, and these currents are strongly dependent on the well casing and formation properties adjacent to the well.

In the present invention, this complex casing antenna source is converted into a distribution of fundamental sources of known or approximated strength, phase and polarization. These micro-sources are energized simultaneously or nearly simultaneously when the true source is energized inside or near the casing. These equivalent sources are generally suitable for geophysical data analysis, modeling and inversion. The following embodiments of the present invention illustrate the specific tasks required to apply a Casing Source to geophysical surveying in realistic environments. However, the same approach can be applied to other Borehole Sources used to energize underground formations. For example, another source configuration is illustrated in International Patent Application No. PCT/US2015/015805, which is incorporated herein by reference.

In particular, the present invention is directed to a system and method for performing an electromagnetic geophysical survey. Current is transmitted from a first source into earth, the first source being located in a borehole. An electromagnetic field generated by the current transmitted from the first source is measured at the surface or deep underground, resulting in a dataset sensitive to the electrical resistivity of the deep subsurface ("subsurface data"). In addition, a background model is constructed and a leakage current distribution is calculated. A model of the resistivity distribution in the earth is derived by modelling the subsurface data using an inverse method designed to fit the measured subsurface data, with the leakage current distribution being used as a source current distribution. In one embodiment, the first source is an electrode connected to a transmitter by a wire or cable. In another embodiment, the first source is a well casing electrically connected to a transmitter, including but not limited to by a wire or cable. In another embodiment, the first source is a long (electrical) conductor (a long conductor can be, for example, production tubing inside a cased or uncased well, or a solid rod inserted into an uncased borehole, or a conducting fluid that fills an uncased borehole, or a solid rod bored or driven directly into the earth. The long conductor could also comprise several elements in series provided they are in electrical connection, such as a conducting borehole casing at its upper end and a conducting fluid in a lower, uncased, region of the borehole) electrically connected to a transmitter, including but not limited to by a wire or cable.

Current is also transmitted from a second source into the earth, the second source being located at or near the surface of the earth. An electromagnetic field generated by the current transmitted from the second source is measured with a set of receivers located at or near the surface resulting in a set of data most sensitive to the electrical resistivity of the near surface ("Near Surface Data"). A near surface resistivity distribution ("Near Surface model:) is derived by modelling the near surface data using an inverse method which updates the background model to fit the measured data. The near surface model is used next to ensure that the near surface resistivity does not dominate the sensitivity of data collected using a deep source.

The background model is constructed by incorporating all available geological and geophysical data which pertains to the resistivity of the earth, including but not limited to well log data, structural interpretations, petrophysical data describing the resistivity of formations, and any other available data which aids in the definition of the subsurface resistivity.

Estimating the leakage current distribution includes modelling: a) the casing parameters (including but not limited to conductivity and magnetic permeability), b) the casing dimensions, geometry, and generally all specifications describing the type and particular segmentation of the borehole casing and c) the resistivity of the surrounding geology. The first step in this modelling is to determine the current density travelling along the casing, from which the casing current distribution is derived, the leakage current distribution is then derived directly from the casing current distribution. In the caser of a long conductor, the same method is applied, but in this case all specifications and parameters of the long conductor are used to model the long conductor. The leakage current distribution is calibrated by comparing electromagnetic fields modeled using the leakage current with measured electromagnetic fields, and the leakage current distribution is updated if the modeled electromagnetic fields do not sufficiently match the measured electromagnetic fields. Alternatively, the leakage current can be calibrated by measurements of the electromagnetic field made in the same borehole where the transmitter is grounded.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

Figure 4A:
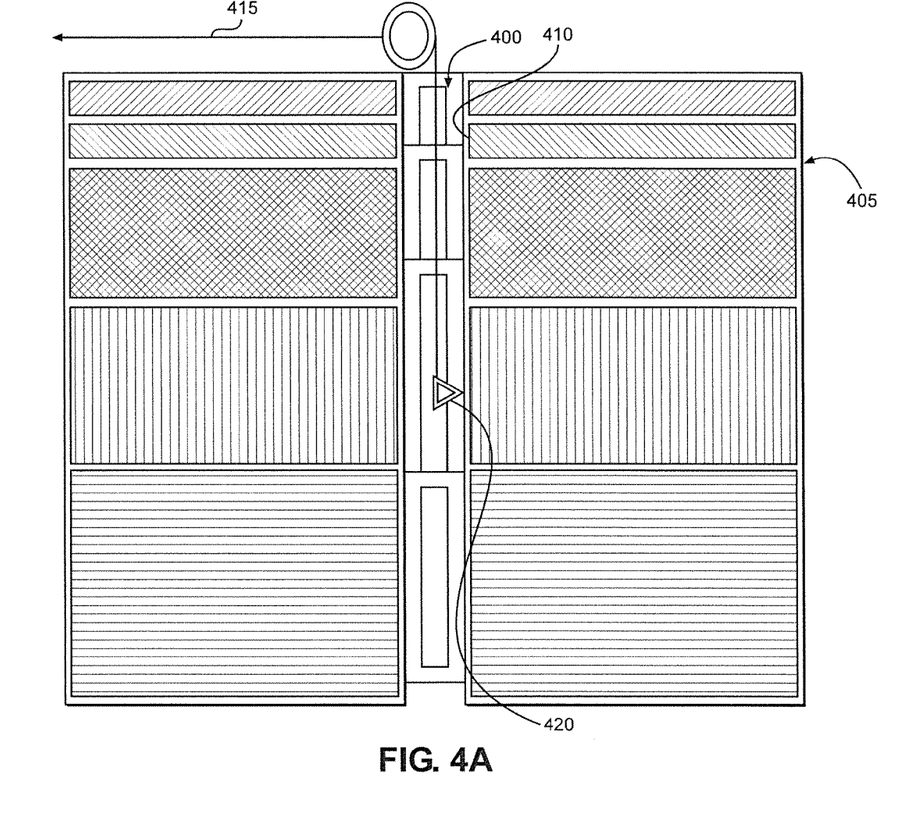
FIG. 4A shows a segmented well casing in a layered formation.
Figure 4B:
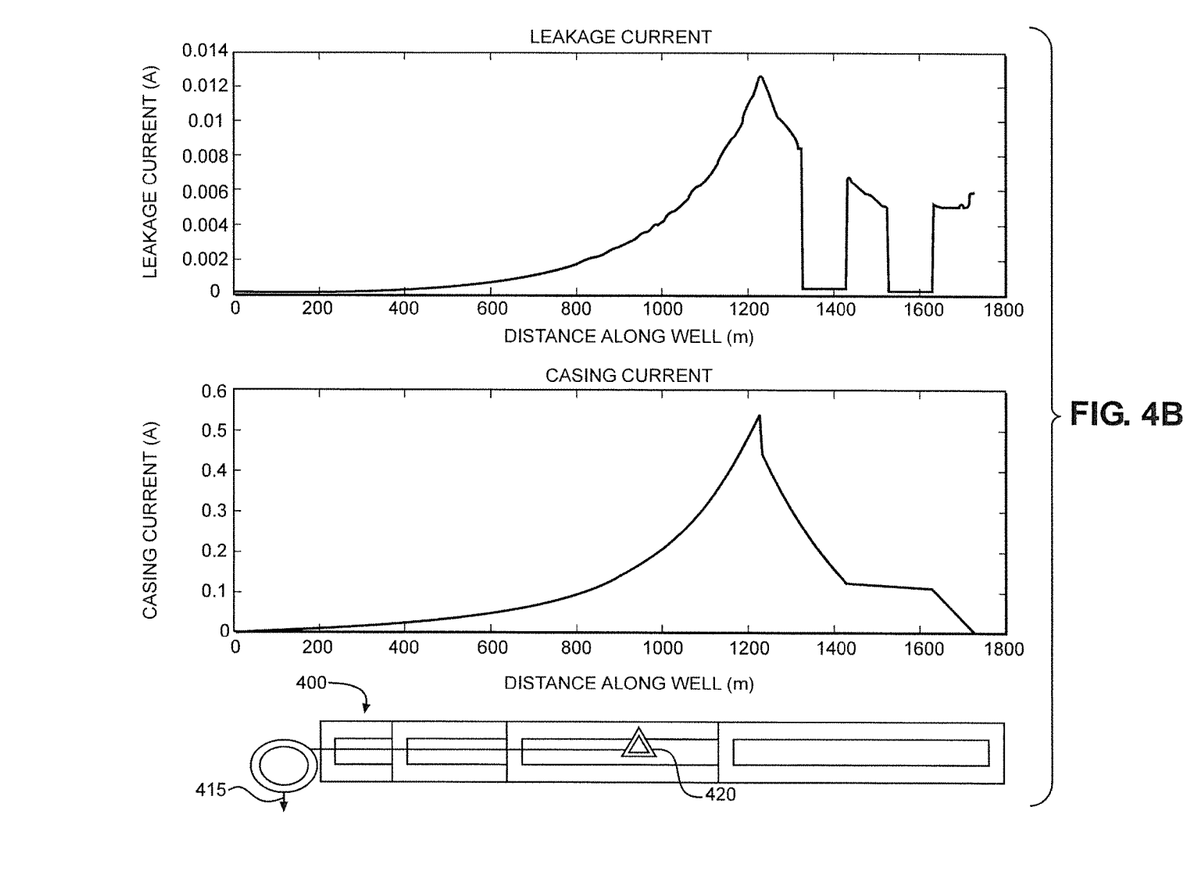
FIG. 4B shows the current flowing along the casing and the current leaking into the formation from the casing.

With initial reference to FIGS. 4A and 4B, there is shown a system for performing an electromagnetic geophysical survey, with the system shown to include a long conductor such as a segmented, steel well casing 400 in an arbitrary layered formation 405. Although casing 400 is shown in a vertical borehole 410, it should be recognized that borehole 410 can have an arbitrary trajectory such as in deviated or horizontal wells. A segmented casing is described by the properties of the individual pipes and casing joints extending throughout the length of the casing. A wire 415 is grounded within casing 400 with the other ground point at a second location on the surface or within a second well (not shown). An electrical current is impressed in this wire using a frequency f at a position marked by a triangle 420. The current that flows from wire 415 and into casing 400 is divided into current flowing along the casing ("casing current") and current leaking into the formation adjacent to the well ("leakage current"). At DC or low frequency AC, it is mostly the leakage current that generates the external EM field. The generated EM field can be measured in the same well, in other wells, at the surface, near the surface or deep underground. An analysis of this field can be used to deduce the electrical properties of the formation where the current flows.

One difficulty is that the casing is a distributed source rather than a point source. That is, the casing source is equivalent to a series of current pole or dipole sources all energized at once as opposed to a single source. Most numerical software can only consider a single discrete current source for any field distribution and would therefore be unsuitable for analyzing the casing antenna data. In practice, the software still calculates the fields from one source at a time; it is simply adding the fields from these individual "micro" sources together for each casing electrode. This issue is also discussed in International Patent Application No. PCT/US2015/016831, which is incorporated herein by reference.

The following description exemplifies how this distributed source can be used in a geophysical survey. In particular, the workflow addresses several issues with the use of this type of source. The first issue is non-unique models. In general, the data measured by the sensors during an EM geophysical survey can be explained by multiple different 3D resistivity distributions in the earth being surveyed. For example, a smaller anomaly located near the surface can produce the same data as a larger anomaly further from the surface. In such a case, it would not be accurate to say there is only a single unique resistivity distribution that explains the data measured by the sensors. In other words, there is a plurality of possible non-unique models of the resistivity distribution. Of course, it should be recognized that it is possible to later eliminate at least some of these additional models by, for example, changing the parameters of the survey. In practice, current is usually injected at more than one depth, including at the earth's surface, and also at more than one frequency. This multiplicity of sources reduces non-uniqueness of models and improves image resolution. With respect to the distributed source in particular, since the distributed source is active over much of the investigated interval simultaneously or nearly simultaneously, the recovered fields are more non-unique than a distribution of fields from point sources. That is, the recovered fields can be represented by an infinite number of different subsurface resistivity models. The second issue is the simultaneous energizing of sources. Specifically, the use of simultaneous or nearly simultaneous sources means that analysis should be done with software that accommodates this characteristic.

Step 1: Construction of the background model. The initial step in the process of the present invention is the construction of a background model that is consistent with or a reasonable representation of the geology and well logs. The model contains the electrical resistivity or conductivity distribution of the medium containing the source and receivers and an extrapolation of this information to the boundaries considered in the modeling. The model works best if it also includes other forms of geological and geophysical data to aid in the accuracy of the model. The model can be generated using standard digital geological software available commercially.

Step 2: Inversion of surface based data. In this step, a model of the near surface geology (approximately the upper 300 m) is derived using surface deployed sources and receivers, i.e., for best results, the well casing should not be utilized in this step. The model is important for the inversion of deeper structures because the measured fields at the surface are dominated by near surface structures and effectively mask the smaller magnitude signatures of deeper structures. By deriving a model from the surface sources and sensors separately, the near surface resistivity distribution can be determined and either fixed in the model or eliminated from the data prior to inverting for the deeper structure. The construction of the background model and the separate inversion of surface based sources and receivers to a near surface resistivity distribution are important steps in mitigating the non-uniqueness of the inverse models from distributed (casing-based) sources such as Borehole Sources. In general, inversion refers to the process by which the data measured by the sensors is used to update the background model and in doing so generate one or more possible resistivity distributions of the earth being measured. The separation of near surface data from deeper data is also discussed in International Patent Application Nos. PCT/US2014/064916 and PCT/US2016/031749, which are incorporated herein by reference.

Step 3: Determination of the leakage current distribution for casing grounded current sources. Current flow in a grounded cased well can be divided into current flow in the casing itself and leakage current into the formation adjacent to the casing. For purposes of the present invention, it is important to have a reasonable model of the leakage current. In order to determine the leakage current, the casing current is modeled and the leakage current is derived from this. There are two main parameters which should be known or approximated to model the casing current: 1) some properties of the steel well casing; and 2) the approximate resistivity of the formation adjacent to the well casing.

In practical terms, the casing current can be calculated from a variety of commercially and/or academically available EM numerical modeling algorithms, and the leakage current can be obtained by a simple numerical differentiation of the casing current. As mentioned above, in order to obtain an accurate model or appropriate approximation of the casing current, it is important to know or have a reasonable estimate of the resistivity adjacent to the well casing and have an accurate model or appropriate approximation of the well casing. These can be obtained from open hole geophysical resistivity logs (also known as induction logs) and/or well completion logs, respectively.

Figure 5:
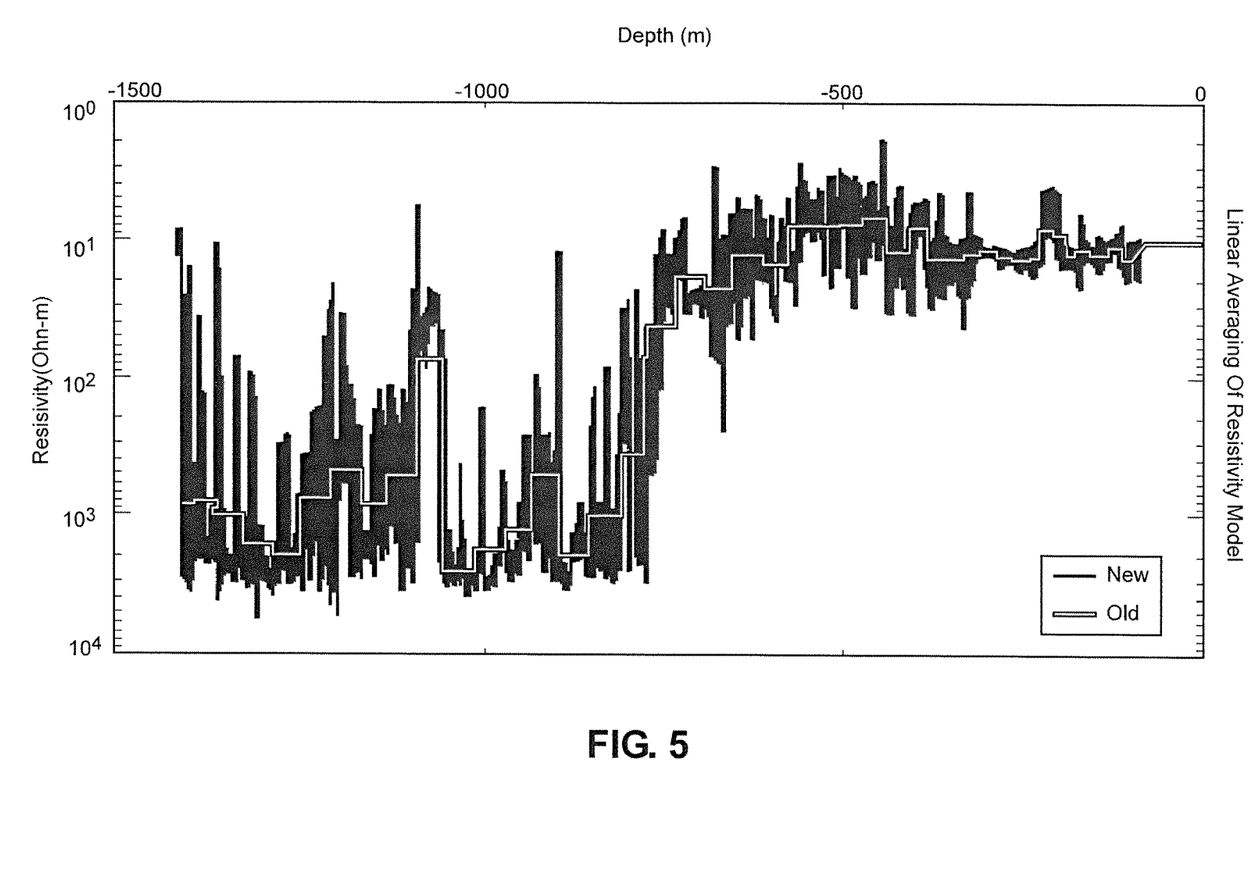
FIG. 5 shows a layered model resistivity distribution derived from a deep induction well log.

One procedure for determining the leakage current includes the following steps. First, a deep borehole resistivity log of the well where the current is injected (or less ideally another well in the area) is obtained. As shown in FIG. 5, this log is separated into one or more discrete layers corresponding to the deep resistivity or induction logs. Second, the well casing properties are determined from the well completion logs or other engineering resources. These properties include casing weight, diameter, thickness and any material notation. Ideally, all of this information is available, but models can be constructed without knowing these properties, in which case they are estimated. One way to make an estimate is by using known properties from similar types of wells and/or running the model with a variety of possible properties to identify best-fit. Third, EM numerical modeling software is used to calculate the casing current with depth based on the frequency, casing properties and formation resistivity adjacent to the well. Fourth, the leakage current is calculated using the following formula in which the z terms correspond to the layer boundaries:

$$I_{leak}(zmid)=(I_{total}(z2)-I_{total}(z1))/(z2-z1)$$

The next step in determining the leakage current is to validate that the modeled result from the previous steps matches the measurements made in the field. This validation can be done in one of two ways: 1) trial and error forward modeling; or 2) inversion. The validation itself is based on the assumption that, since Step 2 has revealed near surface resistivity structure in the model, the main differences between the modeled fields near the wellhead and the measured data near the wellhead are due to an incorrect leakage current model. Therefore, the leakage current model can be updated to ensure the surface fields near the wellhead match the measured data.

Step 4: Inversion of the full data set (or a specific subset of the data set) using a constrained model. When a reasonable background model and a leakage current distribution have been obtained, the borehole to surface EM data can be inverted to a resistivity distribution. This involves the use of an inversion algorithm where the leakage current model is used as a source current distribution. In other words, the Casing Source is replaced by the leakage current model.

At this point in the workflow, the background model has been defined by the available well logs (Step 1), the near surface (to a depth of approximately 300 m) has been defined by the surface based data (Step 2) and a robust estimate of the leakage current has been modeled (Step 3). The near-surface resistivity distribution was accounted for in Step 2, and those results were used to update the resistivity model. In a similar way, data collected using the shallowest source is inverted first to update the resistivity model, and the inversion continues in a stepwise fashion until all the data has been inverted. This is done to ensure that large magnitude anomalies in the surface field due to shallower structure do not hide smaller magnitude anomalies due to resistivity structure in the formation of interest. The number of depth steps included in this iterative procedure could be many, or as few as two to maximize speed and minimize cost.

In summary, it should be recognized that the present invention provides for the use of shallow geophysical survey data to constrain and/or eliminate and/or neutralize underground features that could otherwise skew the analysis and/or inversion and/or interpretation of deep geophysical survey data. Other known information, such as well logs (including but not limited to induction logs) and/or well completion specifications (including but not limited to well diagrams), is incorporated in order to improve accuracy and/or confidence of survey analysis and/or inversion and/or interpretation. Also, data can be acquired from the vicinity of a borehole to better understand current propagation and/or behavior around the vicinity of the borehole in order to improve analysis and/or inversion and/or interpretation of electric-field or electromagnetic surveys that utilize at least one Borehole Source. More specifically, the data acquired is used to calibrate and/or constrain the model and/or background model. The background model is prepared by incorporating known logging information and using surface based sources and receivers to map the near surface resistivity and lock in subsequent inversion. This constraining workflow reduced the non-uniqueness of recovered models. Leakage current is calculated from the grounded electrical source using numerical models, and the leakage current distribution is used as input for forward and inverse numerical modeling algorithms.

Preferably, the above steps are accomplished using a computer system, not separately shown, configured to perform the steps, in communication with various electrodes, receivers, sensors and/or transmitters employed in connection with the present invention. The computer system includes at least a microprocessor for performing calculations, memory for storing data and an input device to allow a user to interact with the computer system.

Based on the above, it should be readily apparent that the present invention provides workflow for EM geophysical surveys where a casing or long conductor is replaced by an equivalent array of electrical sources. Although described with reference to preferred embodiments, it should be readily understood that various changes or modifications could be made to the invention without departing from the spirit thereof. In general, the invention is only intended to be limited by the scope of the following claims.

The invention claimed is:

1. A method comprising: performing an electromagnetic geophysical survey including:
    transmitting current from a first source into a borehole in the earth;
    measuring an electromagnetic field generated by the current transmitted from the first source to create subsurface data;
    transmitting current from a second source into the earth, wherein the second source is located at a surface of the earth;
    measuring an electromagnetic field generated by the current transmitted from the second source with a receiver located at the surface to create near surface data;
    inverting the near surface data to determine a near surface resistivity distribution of the earth;
    constructing a background model and updating the background model based on the near surface resistivity distribution;
    estimating a leakage current distribution; and
    calculating a resistivity distribution of the earth using the subsurface data, the background model and the leakage current distribution, wherein the leakage current distribution is used as a source current distribution, and wherein the resistivity distribution represents results of the electromagnetic geophysical survey.

2. The method of claim 1, wherein the first source is an electrode connected to a transmitter by a wire or cable.

3. The method of claim 1, wherein the first source is a well casing connected to a transmitter by a wire or cable.

4. The method of claim 1, wherein the first source is a long conductor electrically connected to a transmitter.

5. The method of claim 1, wherein calculating the resistivity distribution includes calculating the resistivity distribution using the near surface resistivity distribution.

6. The method of claim 4, wherein constructing the background model includes incorporating data on the resistivity of the earth, and other geological and geophysical data aiding in calculating the resistivity distribution in the earth.

7. The method of claim 4, wherein estimating the leakage current distribution includes:
    calculating a long conductor current distribution; and
    deriving the leakage current distribution from the long conductor current distribution.

8. The method of claim 7, wherein calculating the long conductor current distribution includes:
    determining a resistivity of the earth; and
    determining one or more properties of the long conductor.

9. The method of claim 7, further comprising:
    validating the leakage current distribution by comparing modeled electromagnetic fields with measured electromagnetic fields; and
    updating the leakage current distribution if the modeled electromagnetic fields do not match the measured electromagnetic fields.

10. The method of claim 9, wherein the modeled electromagnetic fields are calculated from the leakage current distribution and the long conductor is replaced by an equivalent array of electrical sources and further comprising identifying subsurface targets of interest.

11. A method comprising: performing an electromagnetic geophysical survey including:
    transmitting current from a first source into a borehole in the earth;
    measuring an electromagnetic field generated by the current transmitted from the first source to create subsurface data;
    constructing a background model;
    estimating a leakage current distribution, wherein estimating the leakage current distribution includes using the following formula:

$$I_{leak}(zmid)=(I_{total}(z2)-I_{total}(z1))/(z2-z1)$$

wherein the z terms correspond to layer boundaries above and below a layer of interest;
    validating the leakage current distribution by comparing modeled electromagnetic fields with measured electromagnetic fields;
    updating the leakage current distribution if the modeled electromagnetic fields do not match the measured electromagnetic fields; and
    calculating a resistivity distribution of the earth using the subsurface data, the background model and the leakage current distribution, wherein the leakage current distribution is used as a source current distribution.

12. A system comprising:
a first source configured to transmit current into earth through a borehole;
a first receiver configured to measure an electromagnetic field generated by the current transmitted from the first source to create subsurface data;
a second source located at a surface of the earth and configured to transmit current into the earth; and
a second receiver located at the surface of the earth and configured to measure an electromagnetic field generated by the current transmitted from the second source to create near surface data; and
a computer system configured to:
construct a background model;
estimate a leakage current distribution;
invert the near surface data to determine a near surface resistivity distribution of the earth; update the background model based on the near surface resistivity distribution; and
calculate a resistivity distribution of the earth using the subsurface data, the background model and the leakage current distribution, wherein the leakage current distribution is used as a source current distribution to perform an electromagnetic geophysical survey.

13. The system of claim 12, wherein the first source is an electrode connected to a transmitter by a wire or cable.

14. The system of claim 12, wherein the first source is a well casing connected to a transmitter by a wire or cable.

15. The system of claim 12, wherein the first source is long conductor electrically connected to a transmitter.

16. The system of claim 12, wherein the computer system is configured to calculate the resistivity distribution using the near surface resistivity distribution.

17. The system of claim 15, wherein the computer system is configured to construct the background model by incorporating data on a resistivity of the earth, and other geological and geophysical data aiding in calculating the resistivity distribution in the earth.

18. The system of claim 15, wherein the computer system is configured to estimate the leakage current distribution by:
calculating a long conductor current distribution; and
deriving the leakage current distribution from the long conductor current distribution.

19. The system of claim 18, wherein the long conductor is a casing the computer system is configured to calculate a casing current distribution by:
determining a resistivity of the earth; and
determining one or more properties of the long conductor.

20. The system of claim 18, wherein the computer system is further configured to:
validate the leakage current distribution by comparing modeled electromagnetic fields with measured electromagnetic fields; and
update the leakage current distribution if the modeled electromagnetic fields do not match the measured electromagnetic fields, wherein the modeled electromagnetic fields are calculated from the leakage current distribution.

* * * * *